(12) United States Patent
Liu et al.

(10) Patent No.: US 12,244,343 B2
(45) Date of Patent: Mar. 4, 2025

(54) HIGH SPEED COMMUNICATION WITH WIDE AREA MOVEABLE RECEIVERS USING INVISIBLE LIGHT

(71) Applicant: TENCENT AMERICA LLC, Palo Alto, CA (US)

(72) Inventors: Yanchen Liu, Palo Alto, CA (US); Yu Ji, Palo Alto, CA (US); Changxi Zheng, Palo Alto, CA (US); Xia Zhou, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 153 days.

(21) Appl. No.: 18/113,520

(22) Filed: Feb. 23, 2023

(65) Prior Publication Data

US 2024/0291563 A1    Aug. 29, 2024

(51) Int. Cl.
*H04B 10/114*    (2013.01)
*H04B 10/516*    (2013.01)

(52) U.S. Cl.
CPC ......... *H04B 10/114* (2013.01); *H04B 10/516* (2013.01)

(58) Field of Classification Search
CPC ............................................. H04B 10/114–116
USPC ................................................. 398/118–131
See application file for complete search history.

(56) References Cited

U.S. PATENT DOCUMENTS

| | | | | |
|---|---|---|---|---|
| 2013/0287403 A1* | 10/2013 | Roberts | ................. | H04B 10/516 398/186 |
| 2014/0057676 A1* | 2/2014 | Lord | .................. | H04B 10/1141 455/556.1 |
| 2014/0270794 A1* | 9/2014 | Rothenberg | ......... | H04B 10/116 398/118 |
| 2017/0310743 A1* | 10/2017 | Aoyama | ............... | G06F 16/958 |
| 2020/0088863 A1* | 3/2020 | Ootaka | .................... | G01S 11/02 |
| 2021/0247842 A1* | 8/2021 | Hudman | ................. | G06F 3/012 |
| 2022/0091671 A1 | 3/2022 | Field et al. | | |
| 2022/0294998 A1* | 9/2022 | Ronchini Ximenes | ..................... | H04N 25/75 |

(Continued)

OTHER PUBLICATIONS

Tencent Technology, ISR and WO, PCT/US2023/032770, Jan. 8, 2024, 23 pgs.

(Continued)

*Primary Examiner* — Li Liu
(74) *Attorney, Agent, or Firm* — Morgan, Lewis & Bockius LLP

(57) ABSTRACT

This application is directed to device synchronization and alignment in extended reality. Two electronic devices create two maps of a scene according to two distinct coordinate systems. A first electronic device determines a device pose of a second electronic device in a first coordinate system of the first electronic device. The device pose is used to determine a transformation relationship between the two coordinate systems. The first electronic device obtains a second object pose that is measured in a second coordinate system of the second electronic device and used to render an object in a second map of the second electronic device. The second object pose is converted to a first object pose in the first coordinate system based on the transformation relationship. The object is rendered concurrently in the first and second maps of the first and second electronic devices based on the first and second object poses, respectively.

21 Claims, 7 Drawing Sheets

(56) References Cited

U.S. PATENT DOCUMENTS

2022/0337316 A1\* 10/2022 Croughwell, III .... G06F 13/102
2023/0050177 A1    2/2023 Grieder et al.

OTHER PUBLICATIONS

Vincent J. Kitsmiller et al., "Frequency Domain Diffuse Optical Spectroscopy with a Near-infrared Tunable Vertical Cavity Surface Emitting Laser", Optics Express, vol. 26, No. 16, DOI: 10.1364/OE.26.021033, Aug. 6, 2018, 11 pgs.

William E. Ryan, "An Introduction to LDPC Codes", Retrieved from the Internet: http://tuk88.free.fr/LDPC/ldpcchap.pdf, Aug. 19, 2003, 23 pgs.

\* cited by examiner

800

---

Receive, by a light detector, an optical signal in a scene that is at least partially illuminated by a light source 802

> The optical signal includes a stream of input data encoded according to a predefined coding scheme 804
>
> The light source includes a vertical-cavity surface-emitting laser (VCSEL), and the light detector includes an avalanche photodiode (APD) 826

↓

Decode the stream of input data from the optical signal in accordance with the predefined coding scheme 806

> The stream of input data is decoded to a stream of data bits, e.g., based on Manchester coding 810
>
>> Each data bit of "1" in the stream of data bits is decoded from a first pair of data bits including two distinct bits 812
>>
>> Each data bit of "0" in the stream of data bits is decoded from a second pair of data bits including two distinct bits, the second pair of data bits distinct from the first pair of data bits 814
>
> The stream of input data is decoded to a stream of data bits; the stream of input data includes a sequence of successive data subsets 816
>
>> The stream of data bits includes a sequence of successive data bit groups, each data bit group including a first number of data bits and corresponding to a respective binary value 818
>>
>> In accordance with the predefined coding scheme, each data bit group of the stream of data bits is decoded from a respective data subset of the stream of input data, where every two "1"s in the stream of input data are separated by at least a predefined number of "0"s 820

↓

Enable display of media content in real time based on the stream of input data 808

> The electronic device is a head-mounted display (HMD) device and includes a display, the stream of input data including a stream of media data 822
>
>> Execute an extended reality application, where the media content is displayed in the extended reality application to create an extended reality environment 824

Figure 8

HIGH SPEED COMMUNICATION WITH WIDE AREA MOVEABLE RECEIVERS USING INVISIBLE LIGHT

TECHNICAL FIELD

This application relates generally to data communication including, but not limited to, systems, devices, methods, and non-transitory computer-readable storage media for communicating data to an electronic device efficiently and reliably using optical signals.

BACKGROUND

Extended reality (XR) systems render high-resolution media content at a high frame rate to create high-quality immersive user experience smoothly. Such content is either pre-loaded in an extended reality headset or streamed via a wired or wireless data link. Many current virtual reality devices are cable-connected to computer machines, and rely on High-Definition Multimedia Interface (HDMI) or Universal Serial Bus (USB) cables to communicate multimedia signals and control signals to XR devices. The cables limit users' movement and easily trip the users up. Alternatively, some battery-powered and wireless XR devices are communicatively coupled to a computer system via one or more wireless networks (e.g., a wireless fidelity (Wi-Fi) network). Many wireless networks are not sufficiently stable and robust for data communication in the context of extended reality. Particularly, Wi-Fi links are not exclusive for individual XR devices, and can be easily cross-coupled to each other or disturbed by communications related to other electronic devices. Additionally, a light-based wireless communication technology (e.g., LiFi) uses visible light pulses emitted by a light emitting diode (LED) for short-range data communication. LiFi-based data communication relies on uninterrupted lines of sight and is highly influenced by changes of local lighting conditions. It would be beneficial to have a robust, stable, and high-speed data communication mechanism than the current practice (e.g., wired, wireless, and LiFi communication links).

SUMMARY

Various embodiments of this application are directed to an indoor light communication system that provides high-speed and high-fidelity wireless data transmission. This indoor light communication system uses invisible light as media to carry information. An example of the invisible light is near infrared light having a wavelength of 940 nm, which is stable independently of a lighting condition of an indoor scene. In some situations, at a transmission side, the invisible light is turned on for a data bit of "1", and turned off for a data bit of "0". While the invisible light is turned on, an indoor scene is substantially entirely illuminated by the invisible light, and walls and ceilings of the indoor scene are applied to enable diffused reflection of the invisible light and overcome constraints of a line of sight. An electronic device (e.g., an XR headset) detects the invisible light with a light detector (also called a photodiode sensor) at an arbitrary orientation or direction, and converts the detected invisible signal to electrical signals that are digitalized to data. By these means, the electronic device can continuously receive media data and control data with the invisible light, when it moves freely in the indoor scene.

In the context of extended reality, data is required to be communicated with high resolution, at a high frame rate, and within a latency tolerance. A light emitter and a light detector are applied to create an optical channel of a certain wavelength (e.g., 940 nm) for streaming media and control data in the context of extended reality at a high data rate (e.g., greater than 1 Gigabit per second (Gbps)). Data communication at such a high data rate enables streaming of high resolution XR media content. In some embodiments, such high-speed data communication is expanded to multiple channels to further increase a communication bandwidth. In some embodiments, the light detector has a compact form factor and is mounted on an off-the-shelf XR headset.

In one aspect, a method is implemented to communicate data at an electronic device including one or more processors and memory. The method includes receiving, by a light detector, an optical signal in a scene that is at least partially illuminated by a light source. The optical signal includes a stream of input data encoded according to a predefined coding scheme. The method includes decoding the stream of input data from the optical signal in accordance with the predefined coding scheme and enabling display of media content, e.g., in real time, based on the stream of input data.

In some embodiments, the predefined coding scheme includes Manchester coding, and the stream of input data is decoded to a stream of data bits based on Manchester coding by the electronic device. Each data bit of "1" in the stream of data bits is decoded from a first pair of data bits including two distinct bits. Each data bit of "0" in the stream of data bits is decoded from a second pair of data bits including two distinct bits. The second pair of data bits is distinct from the first pair of data bits.

In some embodiments, a stream of data bits is decoded from the stream of input data. The stream of data bits includes a sequence of successive data bit groups, and each data bit group includes a first number of data bits. The stream of input data includes a sequence of successive data subsets. In accordance with the predefined coding scheme, each data bit group of the stream of data bits is decoded from a respective subset of the stream of input data that is started or ended with "1" and includes a second number of "0" that are in the respective data bit group and between two immediately adjacent bits of "1". Additionally, in some embodiments, the second number is equal to a respective decimal number corresponding to each data bit group plus a predefined number, and every two "1"s in the stream of input data are separated by at lest the predefined number of "0"s.

In another aspect, an electronic device includes a light detector, one or more processors, and memory. The light detector is configured to receive an optical signal in a scene that is at least partially illuminated by a light source. The optical signal includes a stream of input data encoded according to a predefined coding scheme. The memory stores one or more programs to be executed by the one or more processors. The one or more programs further includes instructions for decoding the stream of input data from the optical signal in accordance with the predefined coding scheme and enabling display of media content, e.g., in real time, based on the stream of input data.

In some embodiments, the light detector configured to detect the optical signal and generate an electrical signal including the stream of input data. The electronic device further includes an analog frontend system coupled to the light detector and one or more processors, and the analog frontend system is configured to convert the electrical signal to a digital signal including the stream of input data. Further, in some embodiments, the analog frontend system further includes an analog-to-digital converter (ADC).

In some embodiments, the electronic device further includes a collimator system. The collimator system is configured to collect the optical signal from the scene according to a restricted incident angle, thereby at least partially suppressing multipathing.

In some embodiments, the light source includes one or more of: a vertical-cavity surface-emitting laser (VCSEL), an emitter lens system coupled to the VCSEL, and a driver coupled to the VCSEL. The VCSEL is configured to emit the optical signal. The emitter lens system is configured to diffuse the optical signal before the optical signal leaves the light source. The driver is configured to generate a drive signal to drive the VCSEL. The driver is coupled to one or more driver processors that is configured to provide a sequence of drive data including the stream of input data to the driver for driving the VCSEL.

In some embodiments, the light source includes a plurality of VCSELs. Each VCSEL is oriented to a distinct direction, and the plurality of VCSELs are driven to illuminate the scene based on the stream of input data in a synchronous manner.

In yet another aspect, a non-transitory computer-readable storage medium stores one or more programs to be executed by one or more processors. The one or more programs include instructions for receiving, by a light detector, an optical signal in a scene that is at least partially illuminated by a light source. The optical signal includes a stream of input data encoded according to a predefined coding scheme. The one or more programs include instructions for decoding the stream of input data from an optical signal in accordance with the predefined coding scheme. The one or more programs include instructions for enabling display of media content, e.g., in real time, based on the stream of input data.

In some embodiments, our system focuses on providing a wireless indoor data communication system which can provides reliable data transmission as well as large moveable area while the user is playing the VR game. Also for those games which are sensitive to the fluctuations caused by the user end, our system can obviously improve the game experience for the users.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 8 is a flow diagram of a method for communicating data wirelessly using invisible light, in accordance with some embodiments.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic systems with digital video capabilities.

Various embodiments of this application are directed to an indoor light communication system that enables high-speed and high-fidelity wireless data transmission. This indoor light communication system uses invisible light as media to carry information, and an example of the invisible light is near infrared light having a wavelength of 940 nm, which works stably and independently of a lighting condition of an indoor scene. While the invisible light is turned on, the invisible light is diffusely reflected by walls and ceilings of the indoor scene to illuminate the indoor scene substantially entirely. An electronic device (e.g., an XR headset) detects the invisible light with a light detector (also called a photodiode sensor) at an arbitrary orientation or direction and converts the detected invisible signal to electrical signals that are digitalized to data. As such, the electronic device can continuously receive media data and control data with the invisible light, when it moves freely in the indoor scene.

Extended reality includes augmented reality (AR) in which virtual objects are overlaid on a view of a real physical world, virtual reality (VR) that includes only virtual content, and mixed reality (MR) that combines both AR and VR and in which a user is allowed to interact with real-world and virtual objects. XR is an interactive experience of a real-world and/or virtual environment where the objects are enhanced by computer-generated perceptual information, e.g., across multiple sensory modalities including visual, auditory, haptic, somatosensory, and olfactory. In the context of XR, content data is required to be communicated with high resolution, at a high frame rate, and within a latency tolerance. A light emitter and a light detector are applied to create an optical channel of a certain wavelength (e.g., 940 nm) for streaming the content data in the context of XR at a high data rate (e.g., greater than 1 Gbps). Data communication at such a high data rate enables streaming of high resolution XR content.

Figure 1:
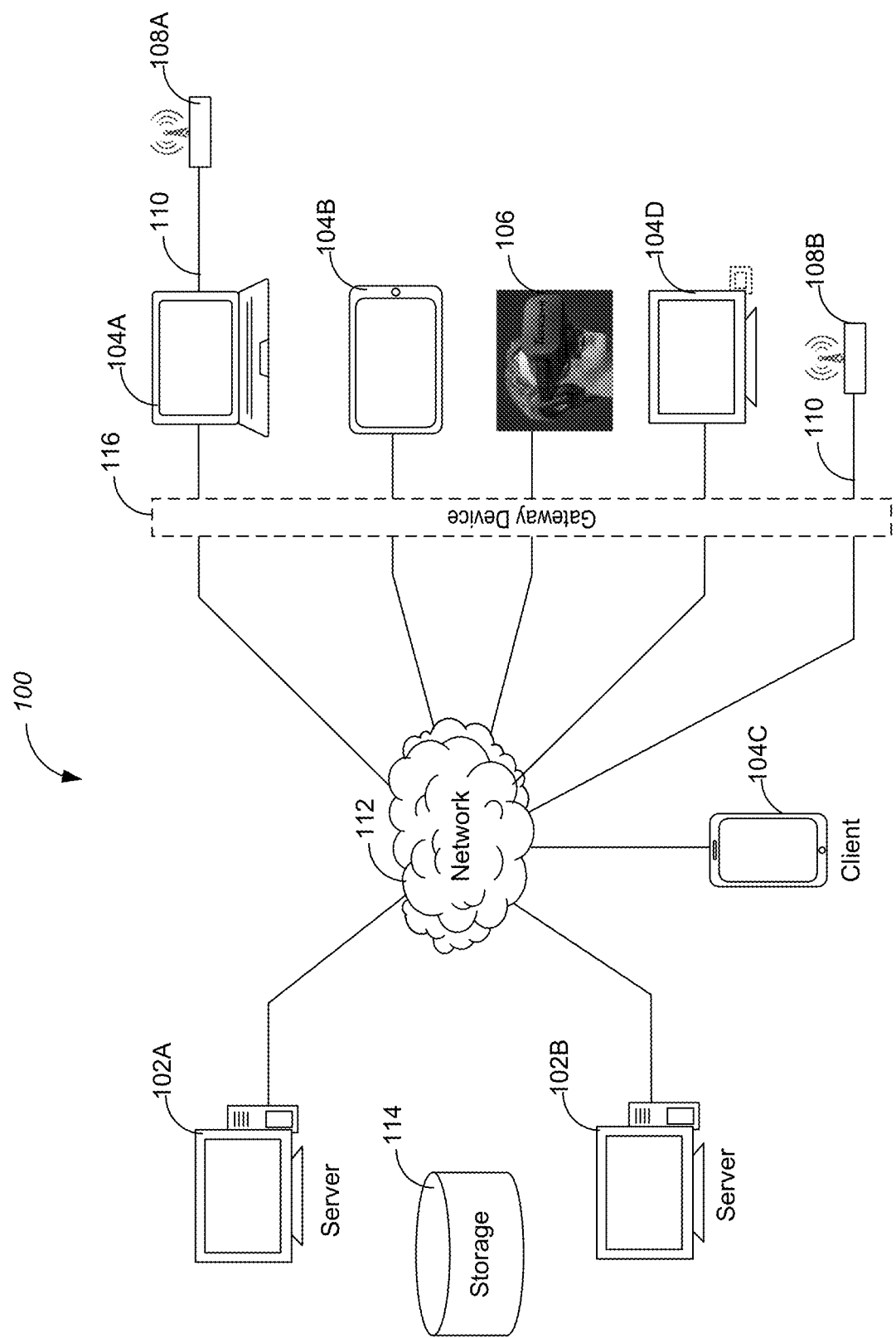
FIG. 1 is an example extended reality (XR) environment, in accordance with some embodiments.

FIG. 1 is an example extended reality (XR) environment 100, in accordance with some embodiments. The XR environment 100 includes one or more of: servers 102, client devices 104, electronic devices 106, and light sources 108. Data 110 includes content data and/or control data related to extended reality, and is provided by a server 102, a client device 104, or a combination thereof. A light source 108 and an electronic device 106 are disposed in proximity to each other in a scene. The light source 108 obtains the data 110, codes the data 110 according to a predefined coding scheme, and emits pulsed optical signals based on the coded data 110. The pulsed optical signals are substantially invisible to human eyes, and correspond to a wavelength greater than 700 nm. An example of the pulsed optical signals is in an infrared light range corresponding to wavelengths between 780 nm and 1 mm. The pulsed optical signals diffuse across and illuminate the scene where the light source 108 and the electronic device 106 are disposed. The electronic device 106 includes a light detector that is exposed to illumination of the pulsed optical signal as the electronic device 106 moves in the scene. The light detector receives the pulsed optical signals and decodes the data 110 based on the predefined coding scheme. The data 110 is used by the electronic device 106 to render XR content on a display of the electronic device 106, thereby creating immersive XR experience for a user of the electronic device 106.

In some embodiments, one or more servers 102 host an online XR platform to provide data 110 to a plurality of user accounts associated with a plurality of electronic devices 106. A server 102 is communicatively coupled to each client device 104 via one or more communication networks 112. In some embodiments, the server 102 provides the data 110 to a client device 104A that further provides the data 110 to a light source 108A via a wired or wireless communication link, allowing the light source 108A to illuminate the scene based on the data 110. An electronic device 106 receives the data 110 based on pulsed optical signals emitted by the light source 108A. Alternatively, in some embodiments, the server 102 is communicatively coupled to, and provides the data 110 to, an electronic device 106 via the communication network(s) 112. The light source 108 is not used to transfer the data 110 to the electronic device 106. Alternatively and additionally, in some embodiments, the server 102 is communicatively coupled to, and provides the data 110 to, a light source 108B via the one or more communication networks 112, allowing the light source 108B to illuminate the scene based on the data 110. The electronic device 106 receives the data 110 based on pulsed optical signals emitted by the light source 108B.

In some embodiments, a computer device 104A acts as a local server to provide data 110 to a light source 108A. In some situations, the computer device 104A is decoupled from the communication network(s) 112, and stores the data 110 in local memory. Alternatively, in some situations, the computer device 104A is communicatively coupled to a server 102, and downloads the data 110 from the server 102. The computer device 104A is optionally coupled to the light source 108A via a wired communication link (FIG. 1) or a local wireless network (not shown, e.g., a Bluetooth link). After obtaining from the computer device 104A the data 110, the light source 108 temporarily stores the data 110, and code the data 110 to the pulsed optical signals to be transmitted to the electronic device 106.

In some embodiments, the data 110 (e.g., a movie, a game, configurations) is stored in the local memory of the light source 108A, before the data 110 is coded to the pulsed optical signals illuminating the scene. In some embodiments, the data 110 is downloaded into the local memory of the light source 108A in real time, concurrently while the data 110 is coded and the pulsed optical signals illuminate the scene.

Each of the plurality of client devices 104 is, for example, a desktop computer device 104A, a tablet computer 104B, a mobile phone 104C, or an intelligent, multi-sensing, network-connected home device 104D (e.g., a smart television device). In an example, the electronic device 106 includes a head-mounted display (HMD), e.g., a pair of AR glasses. In another example, the electronic device 106 includes a robotic system, a mobile phone, or a smart home device. In some embodiments, user inputs are collected from the client device 104, electronic device 106, or a combination thereof. The user inputs are processed remotely by the server(s) 102 and/or locally at each device that collects the user input. The one or more servers 102 provide system data (e.g., boot files, operating system images, and user applications) to the client devices 104 and/or XR devices 106. In some embodiments, the XR environment 100 further includes storage 114 for storing the data 110, user inputs, or both.

In some embodiments, an electronic device 106 includes one or more of: a camera system, a microphone, a speaker, one or more inertial sensors (e.g., gyroscope, accelerometer), a display, and a light detector. The camera system and microphone are configured to capture video and audio data from the scene where the electronic device 106 is disposed. For example, the camera system captures hand gestures of a user wearing the electronic device 106. The inertial sensor(s) are configured to capture inertial sensor data. The microphone records ambient sound, including user's voice commands. The display is configured to display XR content rendered based on the data 110 that is provided by the server 102, client device 104, or a combination thereof. The light detector is configured to detect the pulsed optical signals that are emitted by the light source 108 and carry the data 110.

In some embodiments, the servers 102, client devices 104, electronic devices 106, light sources 108, and storage 114 are communicatively coupled to each other via one or more Communication networks 112, which are the medium used to provide communications links between these devices and computers connected together within the XR environment 100. Communication networks 112 include connections, such as wire, wireless communication links, or fiber optic cables. Examples of communication networks 112 include local area networks (LAN), wide area networks (WAN) such as the Internet, or a combination thereof. Communication networks 112 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), WiMAX, or any other suitable communication protocol. A connection to communication networks 112 is established either directly (e.g., using 3G/4G/5G connectivity to a wireless carrier), or through network interface 116 (e.g., a router, switch, gateway, hub, or an intelligent, dedicated whole-home control node), or through any combination thereof. As such, communication networks 112 can represent the Internet of a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other electronic systems that route data and messages.

Figure 2:
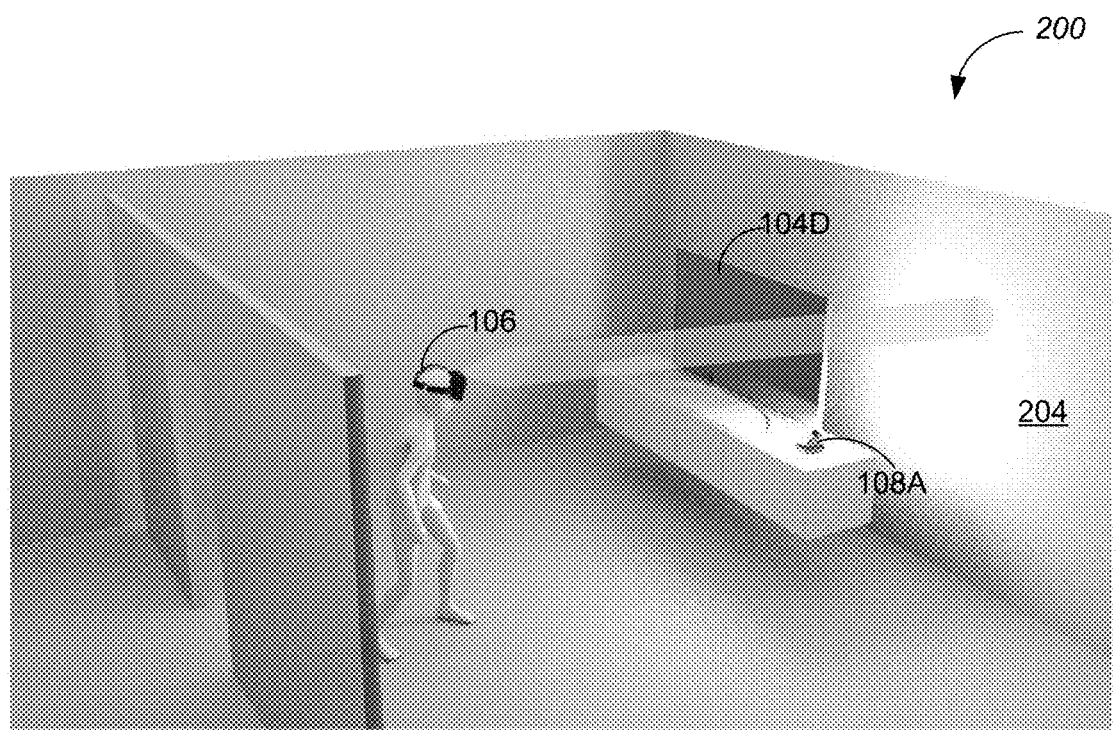
FIG. 2 is an example scene in which data is communicated to an electronic device using invisible light, in accordance with some embodiments.

FIG. 2 is an example scene 200 in which data is communicated to an electronic device 106 (e.g., AR glasses) using invisible light, in accordance with some embodiments. The electronic device 106 is configured to receive the invisible light from a light source 108, recover input data from the invisible light, and render media content on a display based on the input data to create immersive extended reality experience for a user. Both the electronic device 106 and the light source 108 are located in the scene 200, allowing the invisible light to be transmitted from the light source 108 to the electronic device 106 without being blocked. In some embodiments, the light source 108 includes a diffuser unit (e.g., a wide range diffusion lens or filter) configured to diffuse the invisible light emitted by the light source 108. The electronic device 106 located in the scene 200 is exposed to the invisible light, while the invisible light as diffused is not targeted at the electronic device 106. Optionally, the electronic device 106 receives the invisible light directly from the light source 108. Optionally, the electronic device 106 receives the invisible light that is reflected by a structure 204 (e.g., a wall, a ceiling, furniture) located in the scene 200. The structure 204 partially diffuses the invisible light in addition to the diffuser unit of the light source 108 (if any).

The electronic device 106 is moveable in the scene 200, and the light source 108 is fixed at a location in the scene 200. The light source 108 transmits the invisible light to the electronic device 106 without using any wire. In some embodiments, the invisible light generated by the light source 108 is diffused to illuminate the entire scene 200, and the electronic device 106 can detect the invisible signal from any position and direction in the scene 200. In some embodiments, the scene 200 is rearranged to create a large open area to allow the electronic device 106 to move freely and receive the invisible light without being blocked by an obstacle. Particularly, in some situations, the electronic device 106 includes a wireless VR headset and executes a user application (e.g., a battle game) that involves movement of the electronic device 106 in the scene 200.

In some embodiments, the invisible light that carries the input data associated with the media content includes an infrared light signal in an invisible light domain corresponding to a wavelength range between 780 nm and 1 mm, and the light source 108 illuminates the scene 200 with infrared light. In an example, a wavelength of the invisible light is 940 nm, and a solar radiation level is substantially low. Specifically, in some embodiments, the invisible light emitted by the light source 108 includes far infrared light with wavelength from 15 μm to 1 mm. Alternatively, in some embodiments, the invisible light emitted by the light source 108 includes ultraviolet light with wavelength from 10 nm to 400 nm. Additionally, in some embodiments, the invisible light emitted by the light source 108 includes a combination of ultraviolet light and infrared light.

In some embodiments, the electronic device 106 executes a gaming application for indoor wireless VR gaming or a media play application that requires video streaming. Both the gaming application and the media play application require a high data rate, e.g., greater than a threshold data rate (e.g., 1 Gbps). The invisible light offers an ultra-fast and stable data transmission solution for the gaming application and the media play application. Particularly, in some embodiments, the invisible light is entirely used for data communication between the light source 108 and the electronic device 106. A communication bandwidth of this invisible light does not need to be shared with other XR-related electronic devices 106 or smart home devices in the scene 200, nor could cross-talking or interference from other XR-related electronic devices 106 or smart home devices 104D happen. By these means, the invisible light offers a fast and stable data transmission solution for the user application that requires high-speed and low-noise data communication.

Additionally, a communication range is physically limited by a structure 204 of the scene (e.g., by wall, ceiling, and floor), thereby guaranteeing that the input data carried by the invisible light is transmitted with a level of privacy. In some embodiments, the scene includes a closed space protected by structures 204 (e.g., wall, ceiling, or floor) that are not penetrable by the invisible light emitted by the light source 108. The input data is securely limited within the closed space, thereby providing a high level of privacy. Even when there are windows, the level of privacy is usually not affected.

Figure 3:
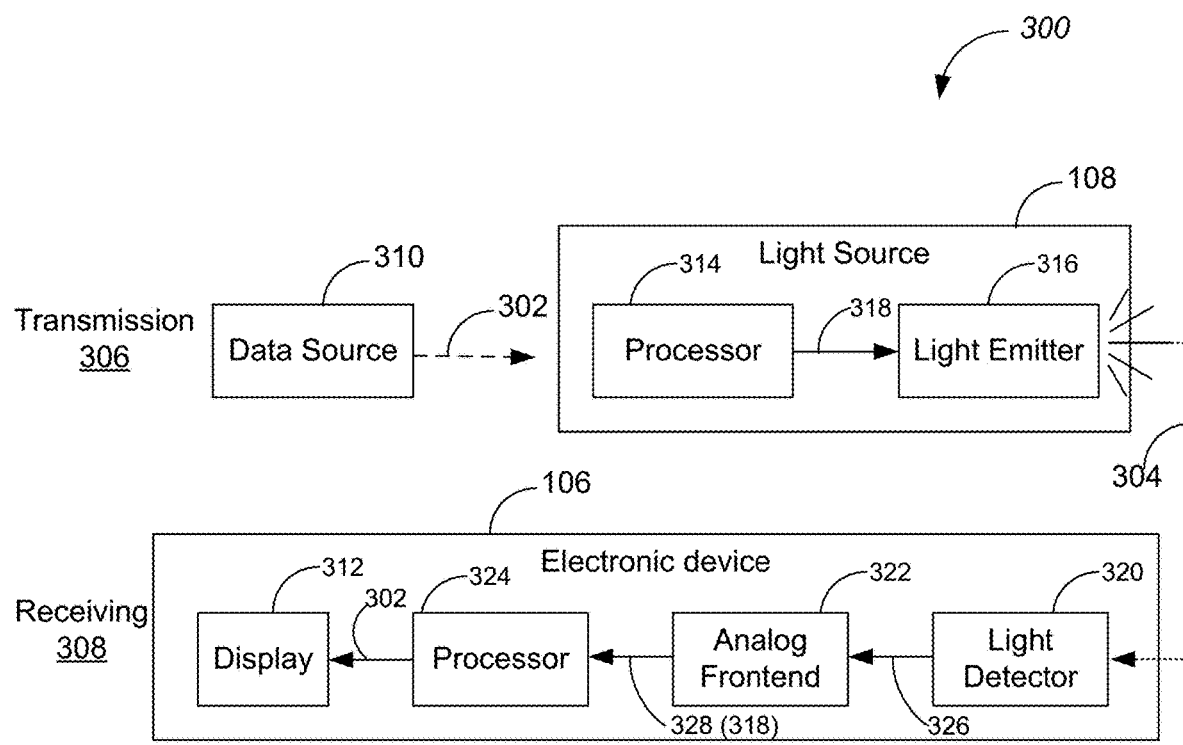
FIG. 3 is a block diagram of an optical communication system for communicating a stream of data bits to an electronic device using invisible light, in accordance with some embodiments.

FIG. 3 is a block diagram of an optical communication system 300 for communicating a stream of data bits 302 to an electronic device 106 using invisible light, in accordance with some embodiments. The optical communication system 300 includes a transmission side 306 and a receiving side 308. The transmission side 306 includes a light source 108 and a data source 310. The data source 310 is configured to provide the stream of data bits 302 to the light source, and further includes a remote server 102 (FIG. 1), a local computer device 104A (FIG. 1), or a combination thereof. In some embodiments, the stream of data bits 302 is communicated from the data source 310 to the light source 108 according to a Transmission Control Protocol (TCP). The light source 108 generates the invisible light including a pulsed optical signal 304 based on the stream of data bits 302. The receiving side 308 includes an electronic device 106 (e.g., an electronic device 106), which is configured to receive the optical signal 304 (which is part of the invisible light), recovers the stream of data bits 302 from the optical signal 304, and renders play of media content (e.g., XR content) on a display 312 of the electronic device 106.

On the transmission side 306, the light source 108 includes one or more processors 314 and a light emitter 316. The one or more processors 314 receives the stream of data bits 302 and encodes the stream of data bits 302 to generate a stream of input data 318 for the light emitter 316 according to a predefined coding scheme (e.g., Manchester coding). In an example, the processor(s) 314 includes a field-programmable gate array (FPGA). In some embodiments, the stream of data bits 302 is carried by a serial digital signal, and the input data 318 includes a pair of low voltage differential signals (LVDS). The light emitter 316 is configured to receive the input data 318 and generate the invisible light including the optical signal 304. In some embodiments, the light emitter 316 includes an LED.

Alternatively, in some embodiments, the light emitter 316 includes a vertical-cavity surface-emitting laser (VCSEL) and a laser driver. The VCSEL is configured to emit the pulsed optical signal 304 of the invisible light. In some situations, the VCSEL has a high power level (e.g., greater than a threshold power) and a high speed (e.g., greater than a threshold speed). The laser driver is coupled to the processor(s) 314 and configured to receive the input data 318 (i.e., a sequence of drive data including the stream of input data) and generate a drive signal to drive the VCSEL. In some embodiments, the driver signal alternates between a high drive voltage and a low drive voltage to turn on and off the VCSEL in response to data bits of "1" and "0" in the input data 318, respectively. In some embodiments, the light emitter 316 send the input data 318 at a fixed data rate using the pulsed optical signal 304 of the invisible light.

In some embodiments, the light emitter 316 further includes an emitter lens system coupled to the VCSEL, and the emitter lens system is configured to diffuse the optical signal before the invisible light leaves the light source 108. For example, the emitter lens system includes a diffuser film (i.e., a lenticular lens array) disposed in front of the VCSEL. The invisible light is uniformly diffused to a field of view (FoV) in the scene 200 (FIG. 2). Specifically, in an example, the light source 108 is placed on a surface of a table. An illumination angle of the invisible light is 80° and 112° with reference to two orthogonal axes that are parallel to the surface of the table. The VCSEL of the light source 108 faces towards a ceiling or wall structure 204, and light emitted by the VCSEL is reflected by the ceiling or wall structure 204 to illuminate the scene 200. Further, in some embodiments, the light emitter 316 includes a plurality of VCSELs that are oriented towards different directions. Each VCSEL is oriented to a distinct direction, and the plurality of VCSELs are driven to illuminate the scene 200 based on the stream of input data 318 in a synchronous manner.

On the receiving side 308, the electronic device 106 includes a light detector 320, an analog frontend system 322, and one or more processors 324. The light detector 320 is configured to detect the optical signal 304 and generate an electrical signal 326 from the optical signal 304. The analog frontend system 322 is coupled to the light detector 320 and one or more processors 324, and configured to convert the electrical signal 326 to a digital signal 328 including the input data 318. In some embodiments, the analog frontend system 322 further includes one or more of: an analog-to-digital converter (ADC), a level shifter, and a comparator. The one or more processors 324 are configured to decode the digital signal 328 (e.g., including the input data 318) according to the predefined coding scheme, extract the stream of data bits 302, and render play of the corresponding media content on the display 312 based on the extracted data bits 302. In an example, the processor(s) 324 includes an FPGA configured to extract the data bits 302 from the digital signal 328 based on software decoding.

Figure 4A:
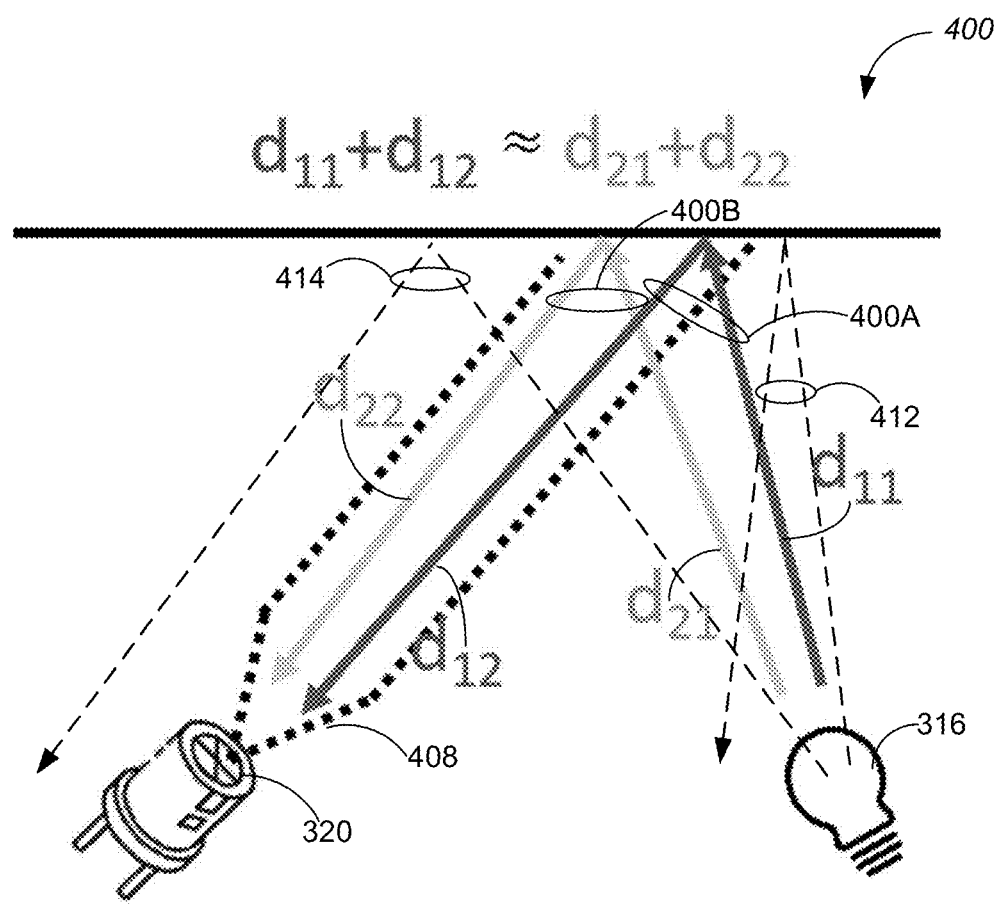
FIG. 4A is a diagram of two light paths of invisible light that is emitted by a light emitter of a light source and received by a light detector of an electronic device, in accordance with some embodiments.

In some embodiments not shown, the light detector 320 includes or is coupled to a receiver lens system. The receiver lens system is configured to collect the optical signal 304 from the scene 200 according to a restricted incident angle, thereby at least partially suppressing multipathing. In some embodiments (FIG. 4B), the light detector 320 includes an avalanche photodiode (APD), and includes or is coupled to a collimator system 450. The APD is a free space receiver and is configured to detect photons from different incoming directions. In some embodiments, the APD has a high optical sensitivity (e.g., greater than a threshold sensitivity), and is configured to generate a voltage pulse in response to receiving a small number of light photons. The collimator system 450 is configured to define a range for an incident angle of the optical signal 304 reaching the APD for the purposes of controlling a multipathing effect. The collimator system 450 limits the incident angle of the APD such that the APD can sense light received inside a cone 408 of parallel light (FIG. 4A). The cone includes incident light travelling along similar optical paths (e.g., 400A and 400B). Further, in some embodiments, the collimator system 450 includes a group of lens having aperture sizes large and wide enough to compensate a signal weakening effect caused by the collimator restricting the incident angle of the optical signal 304. In an example, the aperture size is greater than a threshold aperture size. More details on the collimator system 450 and multipathing effect are explained below with reference to FIGS. 4A and 4B.

Figure 4B:
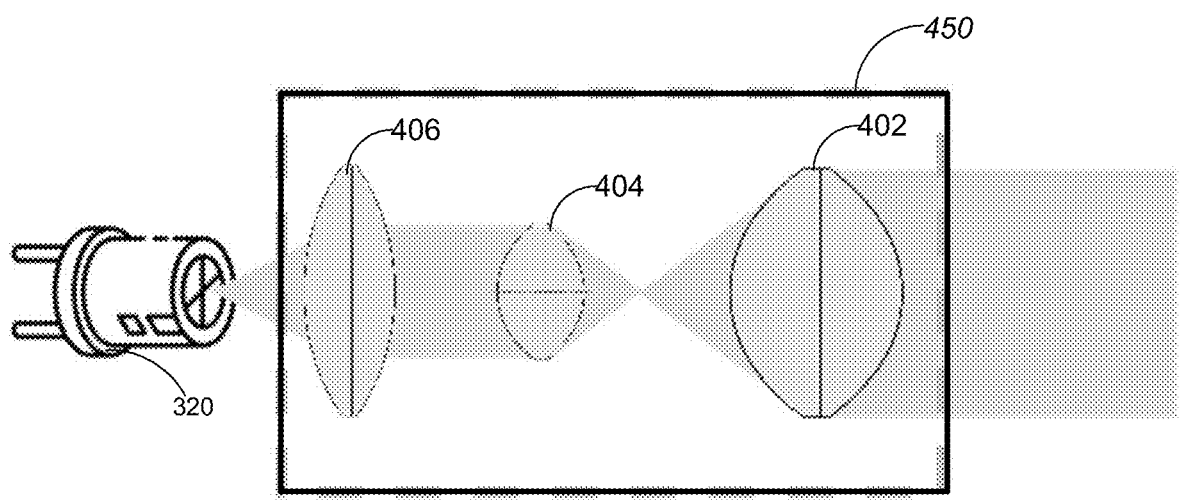
FIG. 4B is a block diagram of an example collimator system including a sequence of optical lenses, in accordance with some embodiments.

FIG. 4A is a diagram of two light paths 400 of an optical signal 304 that is emitted by a light emitter 316 of a light source 108 and received by a light detector 320 of an electronic device 106, in accordance with some embodiments. FIG. 4B is a block diagram of an example collimator system 450 including a sequence of lenses 402-406, in accordance with some embodiments. The light emitter 316 of the light source 108 generates invisible light including a pulsed optical signal 304 based on a stream of data bits 302 (FIG. 3). The optical signal 304 propagates in a scene 200. The light detector 320 of the electronic device 106 receives the optical signal 304, and recovers the stream of data bits 302 from the optical signal 304. In some embodiments not shown, the light emitter 316 includes or is coupled to an emitter lens system configured to diffuse the invisible light before the invisible light leaves the light source 108. In some embodiments, the light detector 320 includes or is coupled to the collimator system 450 (also called a receiver lens system). The collimator system 450 is configured to collect a portion of the invisible light (i.e., the optical signal 304) from the scene 106 arriving in a restricted range of incident angle, and at least partially suppress multipathing associated with the optical signal 304. As an incident angle of the optical signal 304 is restricted, an incoming direction of the optical signal 304 is substantially aligned in a specific direction (i.e., to make collimated light or parallel rays), and a spatial cross section of the portion of the optical signal 304, which can reach the light detector 320, is limited by an aperture size of an input lens 402 of the collimator system 450.

In some embodiments, the light emitter 316 includes a VCSEL that emits invisible light including the optical signal 304. Further, in some embodiments, an emitter lens system is coupled to the VCSEL to diffuse the invisible light before the invisible light leaves the light source 108. For example, the emitter lens system includes a diffuser film (i.e., a lenticular lens array) disposed in front of the VCSEL. The invisible light is uniformly diffused to a field of view (FoV) in the scene 200 (FIG. 2). Specifically, in an example, the light source 108 is placed on a surface of a table. An illumination angle of the invisible light is 80° and 112° with reference to two orthogonal axes that are parallel to the surface of the table. The VCSEL of the light source 108 faces towards a ceiling or wall structure 204, and the invisible light emitted by the VCSEL is reflected by the ceiling or wall structure 204 to illuminate the scene 200.

Referring to FIG. 4A, in some situations, the invisible light emitted by the emitter 316 includes a plurality of light paths extending along different directions. The light detector 320 has an aperture having a limited aperture size and can only collect a small portion of the invisible light that happens to hit on the aperture. The collimator system 450 is configured to restrict an incident angle of the invisible light (i.e., the optical signal 304) that enters the aperture of the light detector 320, thereby at least partially suppressing multipathing associated with the invisible light. In some embodiments, a first light path 400A includes a first section $d_{11}$ and a second section $d_{12}$. The first section $d_{11}$ extends from the light emitter 316 to a structure 204, and the second section $d_{12}$ extends from the structure 204 to the light detector 320. A second light path 400B includes a third section $d_{21}$ and a fourth section $d_{22}$. The first section di extends from the light emitter 316 to a structure 204, and the second section $d_{12}$ extends from the structure 204 to the light detector 320. The first light path 400A and the second light path 400B are selected by the collimator system 450 to be substantially equal to each other.

In some embodiments, the light detector 320 includes an APD, and includes or is coupled to a series of collimator lenses 402-406. The APD is a free space receiver and is configured to detect photons from different incoming directions. In some embodiments, the APD has a high optical sensitivity (e.g., greater than a threshold sensitivity), and is configured to generate a voltage pulse in response to receiving a small number of light photons. The collimator lenses 402-406 are configured to restrict a receiving angle of the APD corresponding to a cone 408 of parallel light. Light outside the cone 408 (e.g., light along paths 412 and 414) is not sensed by the APD. Further, in some embodiments, the collimator lens includes a group of lens having aperture sizes greater than a threshold aperture size. The receiving angle of the APD is widened by application of the collimator lenses 402-406.

In other words, the collimator system 450 restricts an incident angle of the incident light within a range (e.g., corresponding to the cone 408), such that photons travelling along optical paths (e.g., 400A and 400B) of similar lengths are selected to reach the light detector 320. While an input lens 402 restricts an incident angle of the input light, an output lens 406 has a substantially large aperture, and is further applied to compensate a light efficiency. The output lens 406 has a focal number that is larger than a threshold focal number (e.g., 1).

In some embodiments, the light detector 320 has a light sensitivity level, and the light emitter 316 has a power level. The light sensitivity level of the light detector 320 is configured to match the power level, such that the portion of the invisible light (i.e., the optical signal 304) emitted by the light source and received by the light detector 320 reaches the light sensitivity level and is detectable by the light detector 320. Stated another way, in some embodiments, the collimator system 450 is configured to provide a receiving angle of the APD that can collect sufficient invisible light, thereby allowing the optical signal 304 received by the light detector 320 to reach the light sensitivity level of the light detector 320.

In some embodiments, photons arrive at the light detector 320 successively at different times, if the photons are emitted from the light emitter 316 simultaneously and pass light paths 400 having different path lengths. These photons may be sampled separately at the two or more distinct times and interpreted as two or more distinct bits, thereby creating a multipathing effect. This multipathing effect may compromise a data rate of the input data 318 transmitted by the optical signal 304 or make the optical signal 304 received by the light detector 320 undecodable or erroneously decoded. The collimator system 450 is applied to at least partially suppress the multipathing effect.

Referring to FIG. 4B, in some embodiments, the light detector 320 is coupled to, and posited at a focal point of, a lens 406 of the collimator system 450 that is configured to restrict an incident angle of the optical signal 304 and at least partially suppress multipathing.

Figure 5A:
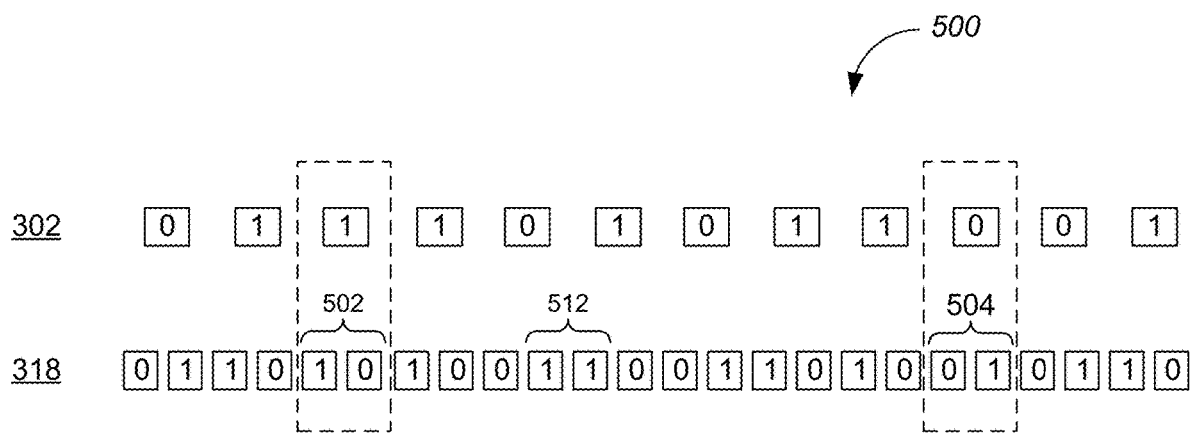
FIG. 5A is a diagram illustrating a predefined Manchester coding scheme applied to encode a stream of data bits, in accordance with some embodiments.

FIG. 5A is a diagram illustrating a predefined Manchester coding scheme 500 applied to encode a stream of data bits 302, in accordance with some embodiments. In some embodiments, the stream of data bits 302 includes media content data and/or associated control data that is applied to enable extended reality for a user. A predefined coding scheme includes Manchester coding, and the stream of input data 318 is generated from a stream of data bits 302 based on Manchester coding. On a transmission side 306, each data bit of "1" in the stream of data bits 302 is encoded to a first pair of data bits 502 including two distinct bits, and each data bit of "0" in the stream of data bits 302 is encoded to a second pair of data bits 504 including two distinct bits. The second pair of data bits is distinct from the first pair of data bits. In some embodiments, each data bit of "1" in the stream of data bits 302 is coded to "10", and each data bit of "0" in the stream of data bits 302 is coded to "01". Conversely, in some embodiments not shown, each data bit of "1" in the stream of data bits 302 is coded to "01", and each data bit of "0" in the stream of data bits 302 is coded to "10".

In some embodiments, the light source 108 includes a laser that cannot be turned on continuously like a normal LED due to a high power consumption. The Manchester coding scheme 500 prevents three continuous data bits of "1" or "0" in the stream of input data 318. The stream of input data 318 at most has two continuous data bits of "1" and two continuous bits of "0". The laser is powered on for at most an extended duration of time corresponding to a length of two data bits in the input data 318.

On a receiving side 308, after recovering the input data 318, the electronic device 106 partitions the input data 318 to a plurality of pairs of data bits, and each pair of data bit includes two distinct bits. The plurality of pairs of data bits include two types of pairs: the first pair of data bits 502 and the second pair of data bits 504. The electronic device 106 decodes each data bit of "1" in the stream of data bits 302 from the first pair of data bits 502, and each data bit of "0" in the stream of data bits 302 from the second pair of data bits 504.

Figure 5B:
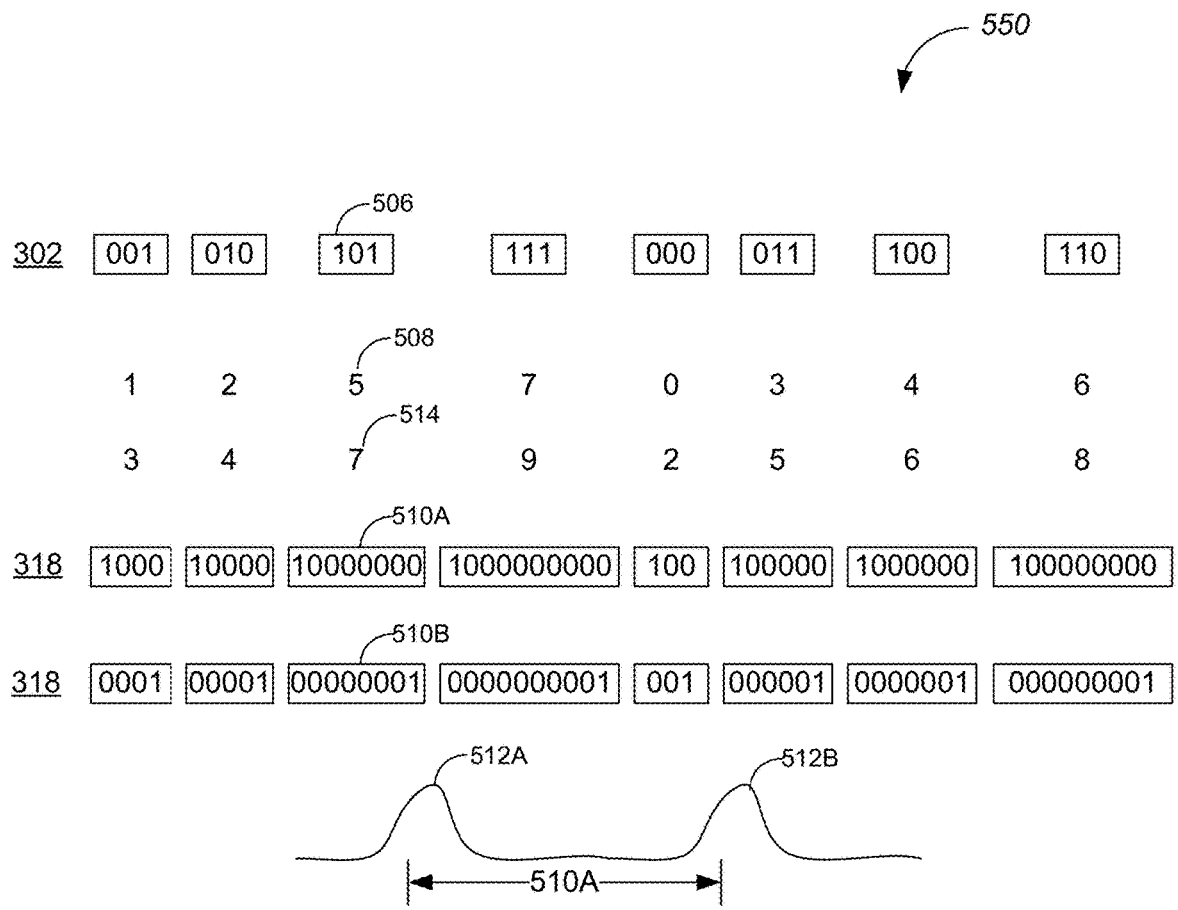
FIG. 5B is a diagram illustrating an another predefined coding scheme applied to encode a stream of data bits, in accordance with some embodiments.

FIG. 5B is a diagram illustrating an another predefined coding scheme 550 applied to encode a stream of data bits 302, in accordance with some embodiments. On a transmission side 306, the stream of data bits 302 is encoded to a stream of input data 318 before the stream of input data 318 is applied to generate invisible light including an optical signal detected by the electronic device 106. The stream of data bits 302 includes a sequence of data bits that can be divided into a sequence of successive data bit groups 506. Each data bit group 506 can be set to include a first number of data bits (e.g., 1 bit, 2 bits, 3 bits, or even more). The stream of input data 318 includes a sequence of successive data subsets 510. In accordance with the predefined coding scheme 550, each data bit group 506 of the stream of data bits 302 is encoded to a respective data subset 510 of the stream of input data 318. In some embodiments, each data bit group 506 is encoded to a respective data subset 510A comprised with various numbers of "1" and "0", such that any two "1"s in the sequence of successive data subset of the stream of input data is separated by at least a predefined number of "0"s. In some embodiments, each of the data subsets 510A starts with a "1", followed by a second number 514 of "0". Alternatively, in some embodiments, each data group 506 is encoded to a respective data subset 510B ended with "1", and preceded by a second number 514 of "0". The laser is powered on for at most an extended duration of time corresponding to a length of one data bit in the input data.

In some embodiments, the second number 514 of "0"s in a data subset 510 is determined based on the respective data bit groups 506, such that each data subset has a correspondence relationship with a data bits group. In some embodiment, a decimal number 508 is determined based on a data bits group. For example, a three-digit binary data bits group can be translated into a single digit decimal number between "0"–"7", e.g. "101" to "5" or "010" to "2". Then the decimal number is increased by a predefined number to get the second number 514. The predefined number can be 1, or 2, or even larger number, depending on what distance between the "1"s is desired. Thereby, when the predefined number is 2, a "101" in data bit groups can correspond to a "10000000" in data subset, a "000" in data bit groups can correspond to a "100" in data subset. In other words, every two bits of "1" of the input data 318 are separated by at least the predefined number of data bits of "0", and the respective decimal number 508 corresponding to each data group 405 of the data bits 302 is increased by the predefined number to give the second number 514.

In some embodiments, on a receiving side 308, the light detector 320 samples the optical signal 304 at a fixed sample rate of an ADC. The stream of input data 318 is recovered from the optical signal 304 and outputted by the ADC. The stream of the input data 318 is further decoded to the stream of data bits 302. An existing problem for optical signal transmission is called multipathing problem. Even if a batch of photons are emitted from the light emitter 316 simultaneously, they may still arrive at the light detector 320 at different times if they pass light paths 400 having different path lengths. Accordingly, some photons from a batch of photons may have been received by the light detector at an earlier time, but some other photons from the same batch may arrive at the light detector later. With the delayed arrival of a few preceding batches, even if each being weaker, still may be accumulated into a signal strength strong enough to pass a detection threshold, such that a "0" may be erroneously taken as "1" in the stream of input data.

It is noted that in some embodiments, the predefined coding scheme 550 is applied to at least partially suppress the multipathing effect. For example, each data subset of the stream of input data 318 may include at least two data bits of "0", when the predefined number is 2, and the larger the decimal number 508 is, the more "0"s are inserted between the "1"s in the stream of input data 318. Every two pulses (i.e. "1"s) of the optical signal 304 are separated by a length of at least two data bits. Two adjacent pulses 512A and 512B can be differentiated as far as each pulse width does not expand over approximately 1.5 data bits, since any delayed effect of a pulse such as 512A will fall on the following "0"s without affecting the following the pulse 512B. In some embodiments, the multipathing effect is substantially evident, resulting in an expanded pulse width. The minimum number of data bits of "0" is increased to separate two adjacent pulses at a price of compromising a data transmission rate. Conversely, in some embodiments, the multipathing effect is not evident, resulting in a narrow pulse width. The minimum number of data bits of "0" is reduced (e.g., to 2) to separate two adjacent pulses, thereby increasing the data transmission rate. As such, the predefined coding scheme 550 can adaptively suppress the multipathing effect by adjusting the minimum number of data bits of "0" between two adjacent data bits of "1". In some embodiment, a calibrating step may be performed, such that a pulse width can be estimated indicating multipathing effect, and the predefined number of "0"s can be adjusted accordingly.

Figure 6:
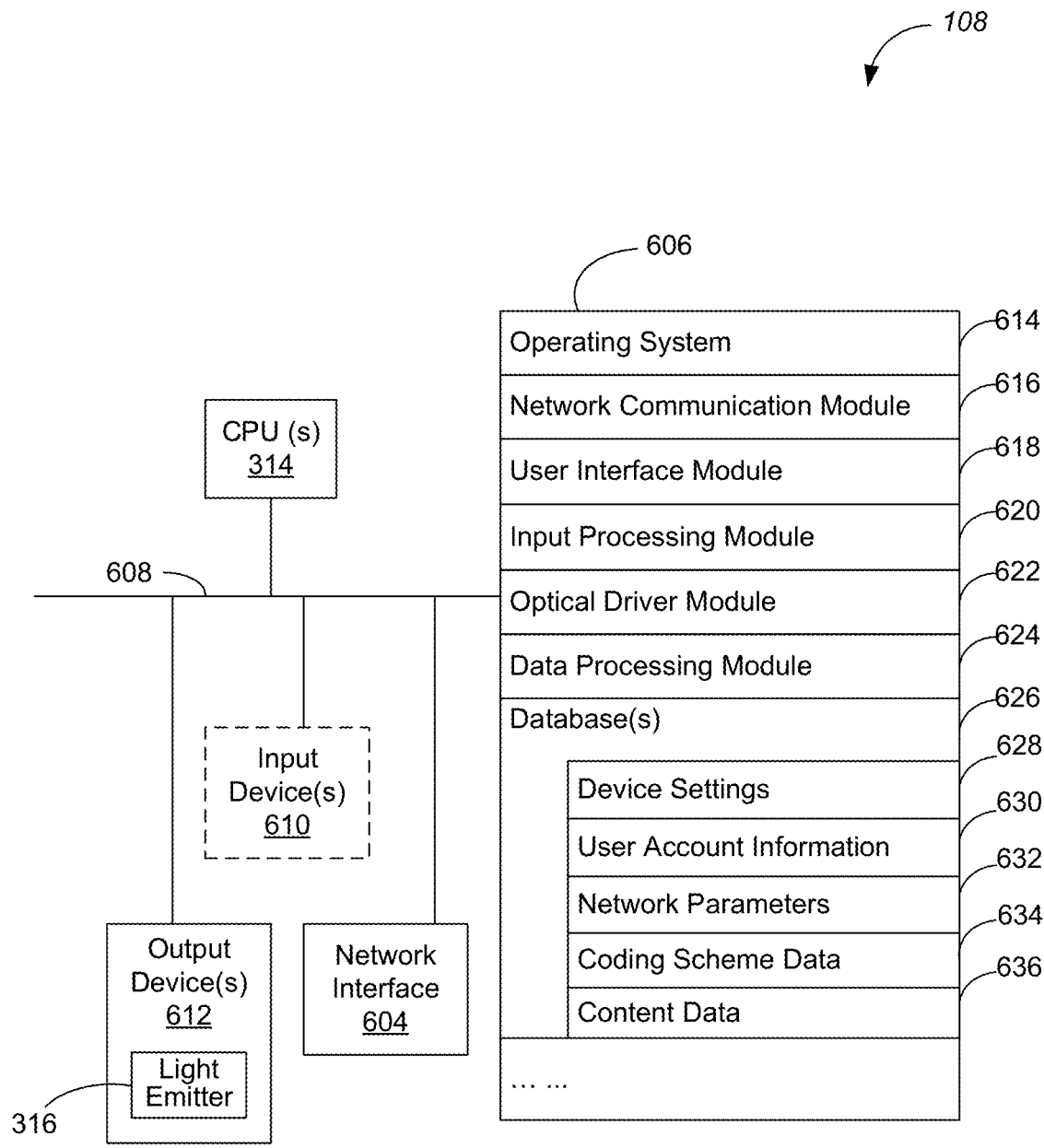
FIG. 6 is a block diagram illustrating a light source, in accordance with some embodiments.

FIG. 6 is a block diagram illustrating a light source 108, in accordance with some embodiments. The light source 108, typically, includes one or more processors 314 (e.g., CPUs), one or more network interfaces 604, memory 606, and one or more communication buses 608 for interconnecting these components (sometimes called a chipset). The light source 108 includes one or more input devices 610 that facilitate user input, such as a button, a touch screen display, a touch-sensitive input pad, a gesture capturing camera, or other input controls. The light source 108 also includes one or more output devices 612, e.g., a speaker, a visual display, and an LED indicator light. The output device(s) 612 includes at least a light emitter 316 (e.g., a VCSEL) configured to be driven by a stream of input data 318 that is encoded from a stream of data bits 302 according to a predefined coding scheme 500 or 550 (FIGS. 5A and 5B). In some embodiments, the light source 108 is communicatively coupled to a server 102 or a client device 104 via the one or more network interfaces 604 or communication buses 608.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, optionally, includes one or more storage devices remotely located from one or more processors 314. Memory 606, or alternatively the non-volatile memory within memory 606, includes a non-transitory computer readable storage medium. In some embodiments, memory 606, or the non-transitory computer readable storage medium of memory 606, stores the following programs, modules, and data structures, or a subset or superset thereof:

- Operating system 614 including procedures for handling various basic system services and for performing hardware dependent tasks;
- Network communication module 616 for connecting the light source 108 to the server 102 or client device 104 via a wired communication link or one or more communication networks 112, such as the Internet, other wide area networks, local area networks, metropolitan area networks, and so on;
- User interface module 618 for enabling presentation of information via the respective output devices 612 (e.g., displays, speakers, etc.);
- Input processing module 620 for detecting one or more user inputs or interactions from one of the one or more input devices 610 and interpreting the detected input or interaction;
- Optical drive module 622 for converting input data 318 encoded from a stream of data bits 302 associated with media data to a drive voltage or current, where the drive voltage or current is applied to drive the light emitter 316 and encode the input data 318 further to invisible light including an optical signal 304 (FIG. 3);
- Data processing module 624 for processing a stream of data bits 302 and/or a stream of input data 318 (FIG. 3); and
- One or more databases 626 for storing at least data including one or more of:
  - Device settings 628 including common device settings (e.g., service tier, device model, storage capacity, processing capabilities, communication capabilities, etc.) of the light source 108;
  - User account information 630 for a user account associated with the light source 108;
  - Network parameters 632 for the one or more communication networks 112, e.g., IP address, subnet mask, default gateway, DNS server and host name;

Coding scheme data 634 for coding data bits 302 to input data 318, where in some embodiments, the coding scheme data 634 includes Manchester codes corresponding to data bits of "1" and "0"; and Content data 636 including input data 318 and data bits 302 corresponding to media data and/or control data, which are applied to enable presentation of XR media content on an electronic device 106.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, memory 606 stores a subset of the modules and data structures identified above. Furthermore, memory 606 stores additional modules and data structures not described above.

Figure 7:
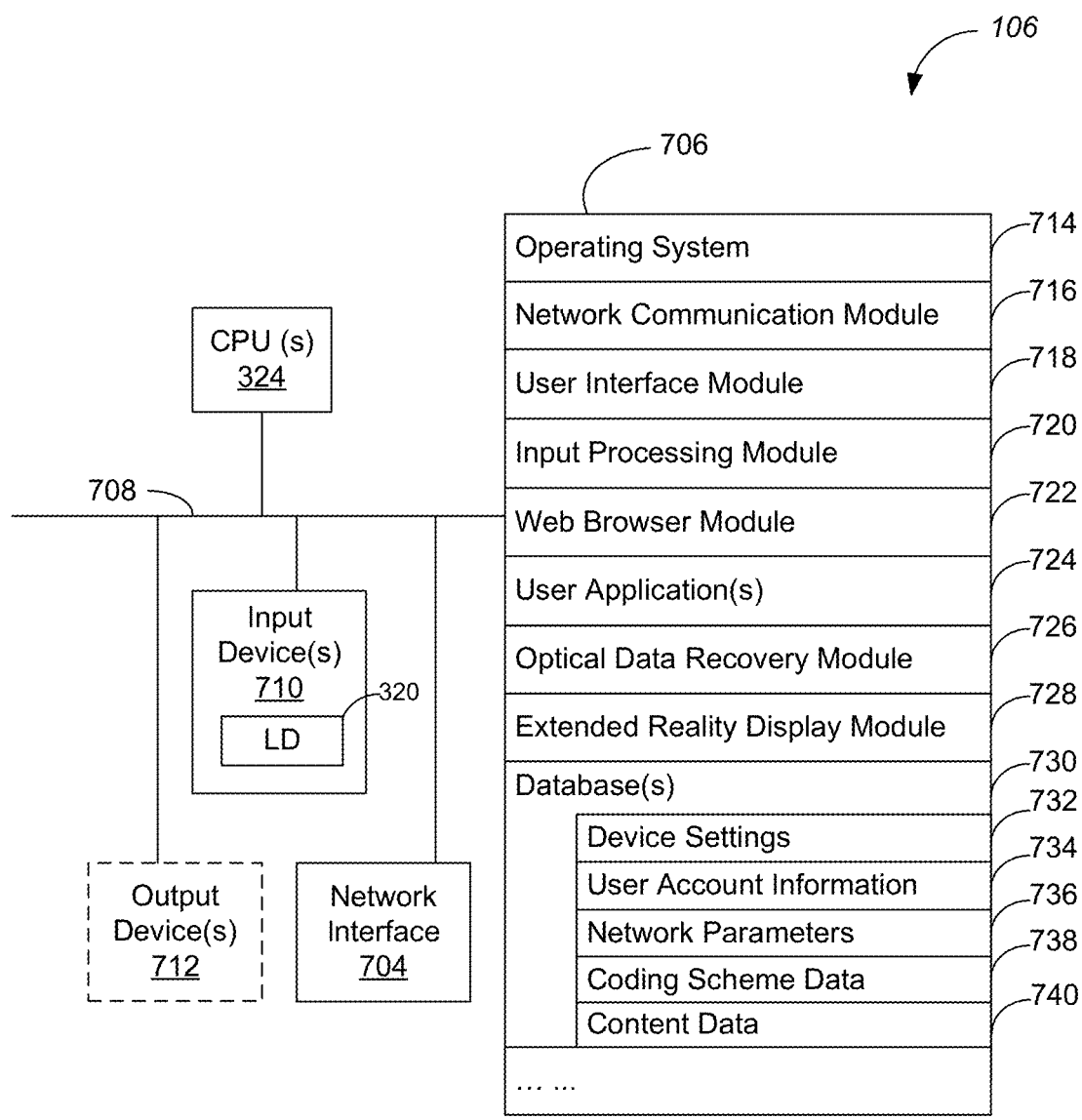
FIG. 7 is a block diagram illustrating an electronic device, in accordance with some embodiments.

FIG. 7 is a block diagram illustrating an electronic device 106, in accordance with some embodiments. An example of the electronic device 106 is an HMD that presents XR media content to a user based on media data including a stream of data bits 302. The electronic device 106, typically, includes one or more processors 324 (e.g., CPUs), one or more network interfaces 704, memory 706, and one or more communication buses 708 for interconnecting these components (sometimes called a chipset). The electronic device 106 includes one or more input devices 710 that facilitate user input, such as a voice-command input unit or microphone, a touch-sensitive input pad, a gesture capturing camera, or other input buttons or controls. The electronic device 106 also includes one or more output devices 712 that enable presentation of user interfaces and display content, including one or more speakers and/or one or more visual displays 312.

In some embodiments, the electronic device 106 includes a light detector 320 and an associated analog frontend system 322 (FIG. 3). The light detector 320 is configured to detect an optical signal 304 and generate an electrical signal 326 from the optical signal 304. The analog frontend system 322 is coupled to the light detector 320 and one or more processors 324, and configured to convert the electrical signal 326 to a digital signal 328 including a stream of input data 318.

Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processors 324. Memory 706, or alternatively the non-volatile memory within memory 706, includes a non-transitory computer readable storage medium. In some embodiments, memory 706, or the non-transitory computer readable storage medium of memory 706, stores the following programs, modules, and data structures, or a subset or superset thereof:

Operating system 714 including procedures for handling various basic system services and for performing hardware dependent tasks;

Network communication module 716 for connecting the electronic device 106 to other devices (e.g., servers 102, client devices 104, other electronic device 202, imaging devices, IOT sensors, and/or storage 114) via a wired communication link or one or more communication networks 112, such as the Internet, other wide area networks, local area networks, metropolitan area networks, and so on;

User interface module 718 for enabling presentation of information (e.g., a graphical user interface for application(s) 724, widgets, websites and web pages thereof, and/or games, audio and/or video content, text, etc.) via the output devices 712 (e.g., displays, speakers, etc.);

Input processing module 720 for detecting one or more user inputs or interactions from one of the one or more input devices 710 and interpreting the detected input or interaction;

Web browser module 722 for navigating, requesting (e.g., via HTTP), and displaying websites and web pages thereof, including a web interface for logging into a user account associated with the electronic device 106, and editing and reviewing settings and data that are associated with the user account;

One or more user applications 724 for execution by the electronic device 106 (e.g., games, social network applications, smart home applications, and/or other web or non-web based applications for controlling another electronic device 106 and reviewing data captured by such devices), wherein the user application(s) 724 includes an extended reality application configured to display media content on the display 312 and create an extended reality environment;

Optical data recovery module 726 for recovering input data 318 from the optical signal 304 and converting the input data 318 to a stream of data bits 302 associated with media data and/or associated control data;

XR display module 728 for displaying media content on the display 312 and creating an extended reality environment based on the stream of data bits 302 that is recovered from the optical signal 304, where in some embodiments, the XR display module and the extended reality application are implemented jointly to enable display of the media content associated with the extended reality environment; and One or more databases 730 for storing at least data including one or more of:

Device settings 732 including common device settings (e.g., service tier, device model, storage capacity, processing capabilities, communication capabilities, etc.) of the electronic device 106;

User account information 734 for the one or more user applications 724, e.g., user names, security questions, account history data, user preferences, and predefined account settings;

Network parameters 736 for the one or more communication networks 112, e.g., IP address, subnet mask, default gateway, DNS server and host name;

Coding scheme data 738 for coding data bits 302 to input data 318, where in some embodiments, the coding scheme data 738 includes Manchester codes corresponding to data bits of "1" and "0"; and Content data 740 including input data 318 and data bits 302 corresponding to media data and/or control data, which are applied to enable presentation of XR media content on an electronic device 106.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, memory 206 stores a subset of the modules and data structures identified above. Furthermore, memory 206 stores additional modules and data structures not described above.

FIG. 8 is a flow diagram of a method 800 for communicating data wirelessly using invisible light, in accordance with some embodiments. In some embodiments, the method 800 is applied in AR glasses, robotic systems, mobile phones, or smart home devices that is physically in proximity to a light source 108 emitting the invisible light. For convenience, the method 800 is described as being implemented by an electronic device 106 including one or more processors and memory. Method 800 is, optionally, governed by instructions that are stored in a non-transitory computer readable storage medium and that are executed by one or more processors of the electronic device 106. Each of the operations shown in FIG. 8 may correspond to instructions stored in a computer memory or non-transitory computer readable storage medium (e.g., memory 706 of the electronic device 106 in FIG. 7). The computer readable storage medium may include a magnetic or optical disk storage device, solid state storage devices such as flash memory, or other non-volatile memory device or devices. The instructions stored on the computer readable storage medium may include one or more of: source code, assembly language code, object code, or other instruction format that is interpreted by one or more processors. Some operations in method 800 may be combined and/or the order of some operations may be changed.

The electronic device 106 has a light detector 320 and receives (802), by the light detector 320, an optical signal 304 in a scene 200 that is at least partially illuminated by a light source 108. The optical signal 304 includes (804) a stream of input data 318 encoded according to a predefined coding scheme. In some embodiments, the light source 108 includes a diffusive light source 108 directed to a wall in the scene 200. The electronic device 106 decodes (806) the stream of input data 318 from the optical signal 304 in accordance with the predefined coding scheme and enables (808) display of media content, e.g., in real time, based on the stream of input data 318.

In some embodiments, the electronic device 106 is moveable in the scene 200, and the light source 108 is fixed at a location in the scene 200.

In some embodiments, the predefined coding scheme includes Manchester coding, and the stream of input data 318 is decoded (810) to a stream of data bits 302 based on Manchester coding. Each data bit of "1" in the stream of data bits 302 is decoded (812) from a first pair of data bits 502 including two distinct bits. Each data bit of "0" in the stream of data bits 302 is decoded (814) from a second pair of data bits 504 including two distinct bits. The second pair of data bits 504 is distinct from the first pair of data bits 502. Stated another way, during encoding, each data bit of "1" in the stream of data bits 302 is encoded to "10" in the stream of input data 318, and each data bit "0" in the stream of data bits 302 is encoded to "01" in the stream of input data 318. In another example, each data bit of "1" in the stream of data bits 302 is encoded to "01" in the stream of input data 318, and each data bit "0" in the stream of data bits 302 is encoded to "10" in the stream of input data 318.

In some embodiments, the stream of input data 318 is decoded to a stream of data bits 302. The stream of data bits 302 includes (818) a sequence of successive data bit groups 506. Each data bit group 506 includes a first number of data bits. The stream of input data 318 includes (816) a sequence of successive data subsets 510. In accordance with the predefined coding scheme 550 (FIG. 5B), each data bit group 506 of the stream of data bits 302 is decoded (820) from a respective subset 510 of the stream of input data 318. Every two "1"s in the stream of input data are separated by at least a predefined number of "0"s. Further, in some embodiments, each data subset of the stream of input data 318 starts or ends with "1" and includes a second number 514 of "0"s, e.g., for remaining bits of the data subset. The second number 514 of "0"s of each data subset of the stream of input data 318 are located between two corresponding bits of "1"s (i.e., a first data bit of "1" starting or ending the respective data bit group 506 and a second data bit of "1" of an immediately adjacent data bit group 506). Further, in some embodiments, the second number 514 is equal to a respective decimal number 508 corresponding to the respective data bit group plus the predefined number. For example, every two bits of "1" of the input data 318 are separated by at least two data bits of "0", and the predefined number is equal to 2. For each data subset of the stream of input data 318, the respective decimal number 508 is increased by 2 to get the second number 514. In other words, every two bits of "1" of the input data 318 are separated by at least the predefined number of data bits of "0", and the respective decimal number 508 of each data bit group 506 is increased by the predefined number to determine the second number 514 associated with the respective data subset 510 of the stream of the input data 318. Additionally, in some embodiments, a self calibration step is implemented in response to receiving the stream of input data 318. During the self calibration step, the predefined number is determined from the stream of input data 318, e.g., in accordance with a determination that every two "1"s in the stream of input data 318 is separated by at least the predefined number of "0"s.

In some embodiments, the optical signal 304 includes an infrared (IR) light signal in an invisible light domain, and the light source 108 illuminates the scene 200 with infrared light. For example, a wavelength of the optical signal is 940 nm, in which a solar radiation level is substantially low.

In some embodiments, the light source 108 includes a diffuser unit configured to diffuse light emitted by the light source 108 in the scene 200, and the optical signal 304 received by the light detector 320 is reflected by a structure 204 in the scene 200. In some embodiments, the light emitted by the light source 108 is at least modulated (e.g., diffused) by an emitter lens system before leaving the light source 108.

In some embodiments, the light detector 320 is coupled to a collimator system 450 configured to restrict an incident angle of the optical signal 304 and at least partially suppress multipathing, e.g., by selecting photons (e.g., 400A and 400B) travelling along optical paths of similar lengths to reach the light detector. Further, in some embodiments, the light detector 320 is coupled to, and posited at a focal point of, the collimator system 450.

In some embodiments, the light detector 320 has a light sensitivity level, and the light source 108 has a power level. The light sensitivity level is configured to match the power level, such that the light emitted by the light source 108 and received by the light detector 320 is detectable by the light detector 320.

In some embodiments, the light detector 320 is coupled to, and posited at a focal point of, a collimator system 450 that is configured to restrict an incident angle of the optical signal 304 and at least partially suppress multipathing, e.g., by selecting photons travelling along optical paths (e.g., 400A and 400B) of similar lengths to reach the light detector 320.

In some embodiments, the electronic device 106 is (822) a head-mounted display (HMD) device and includes a display 312. The stream of input data 318 includes a stream of media data. The electronic device 106 executes (824) an extended reality application, and the media content is displayed in real time in the extended reality application to create an extended reality environment, e.g., in real time, while the stream of input data 318 is received and decoded. In an example, the extended reality application is a gaming application. Further, in some embodiments, the stream of input data 318 further includes configuration data, and the configuration data is applied to execute the extended reality application and display the media content in real time on the display.

In some embodiments, the stream of input data 318 has an input data rate that is substantially constant and remains above a threshold data rate (e.g., 1 Gpbs).

In some embodiments, the light source 108 includes (826) a vertical-cavity surface-emitting laser (VCSEL), and the light detector 320 includes an avalanche photodiode (APD).

It should be understood that the particular order in which the operations in FIG. 8 have been described are merely exemplary and are not intended to indicate that the described order is the only order in which the operations could be performed. One of ordinary skill in the art would recognize various ways to communicate data using invisible light as described herein. Additionally, it should be noted that details of other processes described above with respect to FIGS. 1-7 are also applicable in an analogous manner to method 800 described above with respect to FIG. 8. For brevity, these details are not repeated here.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method for communicating data, implemented at an electronic device including one or more processors and memory, comprising:
   receiving, by a light detector, an optical signal in a scene that is at least partially illuminated by a light source, wherein the optical signal includes a stream of input data encoded according to a predefined coding scheme, and the stream of input data includes a sequence of successive data subsets, and every two "1"s/"0"s in the stream of input data are separated by at least a predefined number of "0"s/"1"s;
   decoding the stream of input data from the optical signal into a stream of data bits in accordance with the predefined coding scheme, wherein the stream of data bits includes a sequence of successive data bit groups, each data bit group including a first number of data bits decoded from a corresponding data subset of the stream of input data; and
   enabling display of media content based on the stream of input data.

2. The method of claim 1, wherein the electronic device is moveable in the scene, and the light source is fixed at a location in the scene.

3. The method of claim 1, wherein each data subset of the stream of input data starts or ends with "1"/"0" and includes a second number of "0"s/"1"s for the rest bits of the data subset.

4. The method of claim 3, wherein the second number of "0"s/"1"s equals to a decimal number corresponding to the respective data bit group plus the predefined number.

5. The method of claim 4, further comprising:
   in response to obtaining the optical signal, determining the predefined number according to a self-calibration step.

6. The method of claim 1, wherein the optical signal includes an infrared (IR) light signal in an invisible light domain, and the light source illuminates the scene with infrared light.

7. The method of claim 1, wherein the light source includes a diffuser unit configured to diffuse light emitted by the light source in the scene, and the optical signal received by the light detector is reflected by a structure in the scene.

8. The method of claim 1, wherein the light detector is coupled to a collimator system configured to restrict an incident angle of the optical signal and at least partially suppress multipathing.

9. The method of claim 8, wherein the light detector is coupled to, and posited at a focal point of, the collimator system.

10. The method of claim 1, wherein the light detector has a light sensitivity level, and the light source has a power level, and the light sensitivity level is configured to match the power level, such that the light emitted by the light source and received by the light detector is detectable by the light detector.

11. The method of claim 1, wherein the electronic device is a head-mounted display (HMD) device and includes a display, the stream of input data including a stream of media data, further comprising:
executing an extended reality application, wherein the media content is displayed in the extended reality application to create an extended reality environment.

12. The method of claim 11, the stream of input data further including configuration data, wherein the configuration data is applied to execute the extended reality application and display the media content in real time on the display.

13. The method of claim 1, wherein the stream of input data has an input data rate that is substantially constant and remains above a threshold data rate.

14. The method of claim 1, wherein the light source includes a vertical-cavity surface-emitting laser (VCSEL), and the light detector includes an avalanche photodiode (APD).

15. An electronic device, comprising:
a light detector configured to receive an optical signal in a scene that is at least partially illuminated by a light source, wherein the optical signal includes a stream of input data encoded according to a predefined coding scheme, and the stream of input data includes a sequence of successive data subsets, and every two "1"s/"0"s in the stream of input data are separated by at least a predefined number of "0"s/"1"s;
one or more processors; and
memory storing one or more programs to be executed by the one or more processors, the one or more programs further comprising instructions for:
decoding the stream of input data from the optical signal into a stream of data bits in accordance with the predefined coding scheme, wherein the stream of data bits includes a sequence of successive data bit groups, each data bit group including a first number of data bits decoded from a corresponding data subset of the stream of input data; and
enabling display of media content based on the stream of input data.

16. The electronic device of claim 15, the light detector configured to detect the optical signal and generate an electrical signal including the stream of input data, further comprising:

an analog frontend system coupled to the light detector and one or more processors, the analog frontend system configured to convert the electrical signal to a digital signal including the stream of input data.

17. The electronic device of claim 16, wherein the analog frontend system further comprises an analog-to-digital converter (ADC).

18. The electronic device of claim 15, further comprising:
a collimator system configured to collect the optical signal from the scene according to a restricted incident angle, thereby at least partially suppressing multipathing.

19. The electronic device of claim 15, wherein the light source includes one or more of:
a vertical-cavity surface-emitting laser (VCSEL) configured to emit the optical signal;
an emitter lens system coupled to the VCSEL, the emitter lens system configured to diffuse the optical signal before the optical signal leaves the light source; and
a driver coupled to the VCSEL, the driver configured to generate a drive signal to drive the VCSEL, wherein the driver is coupled to one or more driver processors that is configured to provide a sequence of drive data including the stream of input data to the driver for driving the VCSEL.

20. The electronic device of claim 15, wherein the light source includes a plurality of VCSELs, each VCSEL oriented to a distinct direction, and the plurality of VCSELs are driven to illuminate the scene based on the stream of input data in a synchronous manner.

21. A non-transitory computer-readable medium storing one or more programs to be executed by one or more processors, the one or more programs comprising instructions for:
receiving, by a light detector, an optical signal in a scene that is at least partially illuminated by a light source, wherein the optical signal includes a stream of input data encoded according to a predefined coding scheme, and the stream of input data includes a sequence of successive data subsets, and every two "1"s/"0"s in the stream of input data are separated by at least a predefined number of "0"s/"1"s;
decoding the stream of input data from the optical signal into a stream of data bits in accordance with the predefined coding scheme, wherein the stream of data bits includes a sequence of successive data bit groups, each data bit group including a first number of data bits decoded from a corresponding data subset of the stream of input data; and
enabling display of media content based on the stream of input data.

* * * * *